United States Patent [19]

Beck

[11] Patent Number: 4,800,926
[45] Date of Patent: Jan. 31, 1989

[54] FIREBREAK FOR CONDUITS

[75] Inventor: Paul C. Beck, Arvada, Colo.

[73] Assignee: Adolph Coors Company, Golden, Colo.

[21] Appl. No.: 71,158

[22] Filed: Jul. 8, 1987

[51] Int. Cl.$^4$ .............................................. F16L 35/00
[52] U.S. Cl. .................................... 138/106; 52/221; 285/119; 285/187; 285/417; 285/423
[58] Field of Search .................. 52/221; 174/78, 84 C, 174/85; 285/47, 50, 53, 58, 64, 119, 187, 192, 238, 417, 423, 56; 138/103, 106, 178

[56] References Cited

U.S. PATENT DOCUMENTS

| | | | |
|---|---|---|---|
| 2,459,720 | 1/1949 | Poltorak | 285/423 |
| 2,787,289 | 4/1957 | Press | 285/423 |
| 3,249,685 | 5/1966 | Heflin, Jr. | 174/85 |
| 3,454,287 | 7/1969 | Thiessen | 285/423 |
| 3,499,972 | 3/1970 | Smith | 174/78 X |
| 3,575,445 | 5/1969 | French | 285/423 |
| 3,744,823 | 7/1973 | Muir et al. | 285/423 |
| 4,012,670 | 3/1977 | Shaw | 174/78 X |
| 4,073,514 | 2/1978 | Pate | 285/417 X |
| 4,086,736 | 5/1978 | Landrigan | 52/221 |
| 4,424,867 | 1/1984 | Mallow | 52/221 X |
| 4,623,170 | 11/1986 | Cornwall | 285/192 X |
| 4,630,415 | 12/1986 | Attwell | 285/189 X |
| 4,642,956 | 2/1987 | Harbeke | 52/221 X |
| 4,748,787 | 6/1988 | Harbeke | 52/221 |

OTHER PUBLICATIONS

Crouse-Hinds Electrical, 5F-18, published 6/1980.
Crouse Hinds Electrical, 7F-4.4, published 12/1977.
Crouse Hinds Electrical, 8F-11, published 10/1963.

Primary Examiner—Stephen Marcus
Attorney, Agent, or Firm—Klaas & Law

[57] ABSTRACT

A system and method for passing conduit through a wall so as to maintain a firebreak for the wall wherein a coupling having relatively low thermal conductivity properties and relatively high fire resistance properties is mounted in an opening in the wall and secured therein by thermal barrier sealing material and one end of a first conduit is inserted into a first side of the coupling and one end of a second conduit is inserted into a second side of the coupling and wherein the first and second conduits have relatively high thermal conductivity properties and wherein the one ends of the first and second conduits are located and maintained a distance from each other so as to provide a thermal barrier therebetween.

19 Claims, 1 Drawing Sheet

FIREBREAK FOR CONDUITS

FIELD OF THE INVENTION

This invention relates generally to the use of firebreaks to prevent the spreading of fires particularly in buildings and more specifically to a system for providing a firebreak for conduits so as to prevent the spreading of a fire from one floor to another floor or one room to another room.

BACKGROUND OF THE INVENTION

The building codes in many localities require the use of firebreaks in the construction of buildings so as to prevent or hinder the spreading of fire from one floor to another floor or one room on a level to another room on the same level. In present practice, when a conduit, such as one used for carrying electric cable, passes from one floor to another floor through a ceiling, the area surrounding the opening through which the conduit passes is filled with a thermal barrier material to function as a firebreak. However, the conduit itself is usually formed from metal and has a relatively high thermal conductivity. Therefore, if a fire breaks out on one floor, the conduit on that floor heats up to a high temperature and conducts a high percentage of that heat to the next adjacent portion of the conduit in the next adjacent floor. If there are flammable materials close to the portion of the conduit to which the heat has been conducted, then there is a good possibility that the flammable material would be ignited and propagage the fire.

BRIEF SUMMARY OF THE INVENTION

This invention provides a firebreak for conduits wherein a thermal barrier is provided between a conduit in one floor and a conduit in another floor so that if a fire starts on the one floor and heats the conduit to a high temperature, only an extremely small percentage of that heat is transferred to the conduit in the another floor so as to eliminate the danger of igniting flammable material in the another floor.

In the preferred embodiment of the invention, the firebreak includes opening means defining an opening extending through a wall between one floor and another floor. A coupling means is mounted in the opening and secured therein by a thermal barrier sealing material forming a seal between the coupling means and the opening means. The coupling means is formed from a material having relatively low thermal conductivity properties and relatively high fire resistance properties. One end of a first conduit means is inserted into a first side of the coupling means and one end of a second conduit means is inserted into the second side of the coupling means. The first and second conduit means are usually formed from metal and have relatively high thermal conductivity properties. Separation means are provided in the coupling means to provide a positive space between the one ends of the first and second conduit means in the coupling means. Retaining means are provided for exerting a retaining force on the one ends of the first and second conduit means after they have been inserted into the coupling means. Therefore, if a fire breaks out on the one floor in which the first conduit means is located, the first conduit means will be retained in the coupling means so that the fire can not be transmitted through the coupling means. The separation between the one ends of the first and second conduit means and the relatively low thermal conductivity properties of the coupling means provide structures that permit only an extremely small percentage of any heat generated in the first conduit means as a result of a fire to be conducted to the second conduit means. Electrical conducting means are provided in the coupling means and provide a continuous electric circuit between the one ends of the first and second conduit means in the coupling means for purposes such as grounding means.

BRIEF DESCRIPTION OF THE DRAWING

An illustrative and presently preferred embodiment of the invention is shown in the accompanying drawings in which.

DETAILED DESCRIPTION OF THE INVENTION

Figure 1:
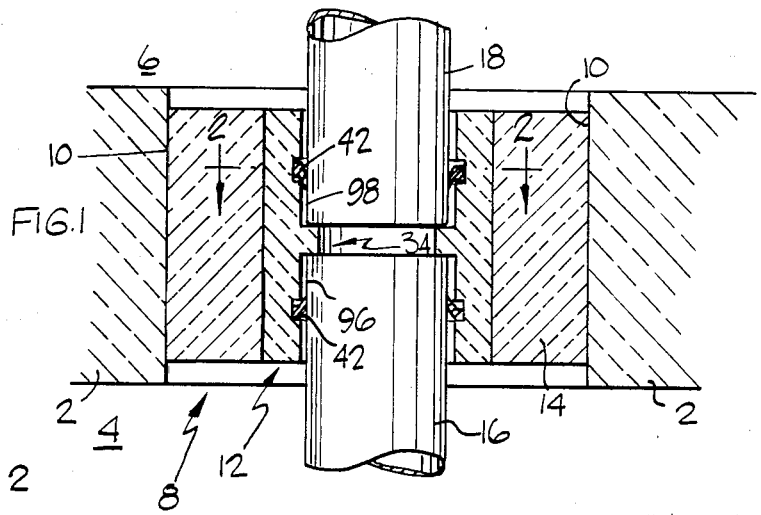
FIG. 1 is a cross-sectional view illustrating the invention.

The preferred embodiment of the invention is illustrated in FIG. 1 wherein a wall means 2 is provided to separate one floor 4 from another floor 6. An opening 8 is formed by the side wall opening means 10 and extends through the wall means 2. A coupling means 12 is positioned in the opening and secured therein using a thermal barrier sealing material 14 to fo rm a thermal seal between the coupling means 12 and the side wall opening means 10. A first conduit means 16 is inserted into a first side of the coupling means 12 and a second conduit means 18 is inserted into a second side of the coupling means 12. The first and second conduit means 16 and 18 are formed from metal and have a thermal conductivity greater than 22 B.t.u. per hr-ft-deg F.

Figures 2, 3, 4, 5:
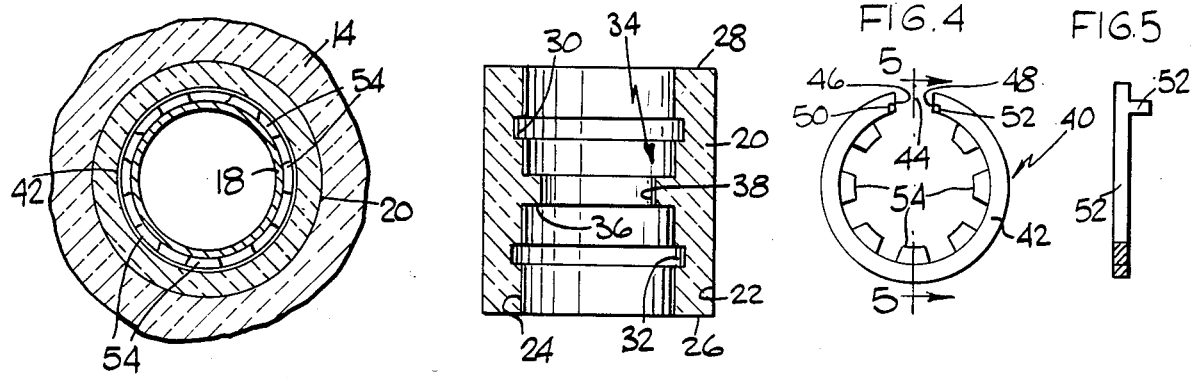
FIG. 2 is a cross-sectional view taken on the line 2—2 of FIG. 1.
FIG. 3 is a cross-sectional view of the coupling means.
FIG. 4 is a front elevational view of the retaining means.
FIG. 5 is a cross-sectional view taken on the line 5—5 of FIG. 4.

The coupling means 12 is specifically illustrated in FIG. 3 and comprises an elongated hollow member 20 having generally cylindrical outer 22 and inner 24 surfaces and opposite end portions 26 and 28. Two spaced apart, annular, radially outwardly extending grooves 30 and 32 are formed in the generally cylindrical inner surface 24. Separation means 34 comprises an annular radially inwardly extending projection means 36 having a generally cylindrical inner surface 38 which has a diameter substantially less than the diameter of the generally cylindrical inner surface 34. A central longitudinal axis extends through the elongated hollow member 20 between the opposite end portions 26 and 28. The coupling means 12 is formed from a material having a thermal conductivity of less than 4.0 B.t.u. hr-ft-deg F. and a fire resistance rating in accordance with ASTM-Test E 814 of at least 3 hours.

The retaining means 40, illustrated in FIGS. 4 and 5, comprises a split locking ring 42 having a space 44 between the ends 46 and 48 thereof. Two axially extending gripping members 50 and 52 are provided next to each of the ends 46 and 48. Each gripping member 50 and 52 has a radial extent substantially less than the radial extent of the split locking ring 42 so as to allow the split locking ring 42 to be positioned in one of the grooves 30 or 32. The split locking ring 42 is formed from a resilient material, such as carbon steel spring, so that the gripping members 50 and 52 may be squeezed toward each other to reduce the outer diameter of the split locking ring 42 which is then inserted into the elongated hollow member 20, positioned radially opposite one of the grooves 30 and 32 and then the gripping members 50 and 52 are released so that the split locking ring expands and is seated in one of the grooves 30 or 32. A plurality of radially inwardly extending, spaced apart fingers 54 are integral with the split locking ring 42. After the split locking ring 42 has been inserted into the groove 30 or 32 and a conduit is inserted into the elongated hollow body 20, the fingers 54 will flex in an axially inward direction to allow for passageway of the conduit through the split locking ring 42. However, if an attempt is made to move the conduit out of the elongated hollow body 20, the fingers 54 will exert a force on the outer surface of the conduit to restrain its withdrawal.

Figure 6:
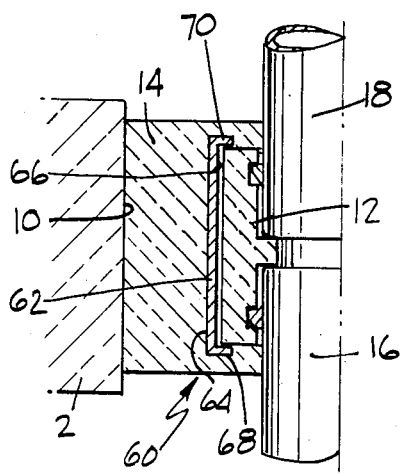
FIG. 6 is a partial cross-sectional view of a portion of another embodiment of the invention.

In FIG. 6, there is illustrated another embodiment of the invention. Protection means 60 are provided for protecting the coupling means 12 from any hard blows or falls or shear forces. This is desirable since the coupling means 12 in the preferred embodiment of the invention is formed from a ceramic material. The protection means 60 comprises an elongated cover 62 having generally cylindrical outer 64 and inner 66 surfaces and opposite end portions 68 and 70. The elongated cover 62 is formed from a relatively rigid material such as steel. The end portions 68 and 70 have an inner diameter greater than the diameter of the cylindrical inner surface 24 so as to be spaced a distance from each of the first and second conduit means 16 and 18. Also, additional thermal barrier sealing material 14 has been applied to encase the outer exposed portions of the protection means 60 and fill the space between the end portions 68 and 70 and the first and second conduit means 16 and 18.

Figure 7:
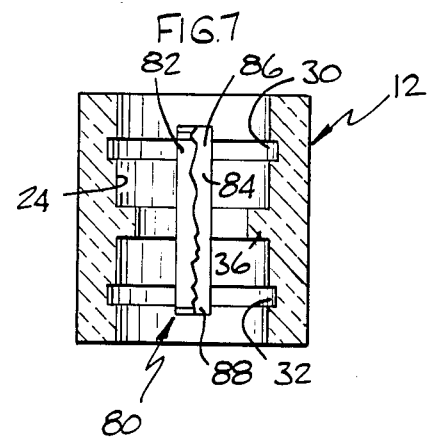
FIG. 7 is a cross-sectional view of a preferred embodiment of the electrical conducting means.

Electrical conducting means 80 are provided for the coupling means 12 and in FIG. 7 comprises an axially extending groove 82 formed in the cylindrical inner surface 24 so that it extends radially outwardly therefrom. A strip 84 of an electrical conducting material is secured in the groove 82 and has exposed end portions 86 and 88 in the groove 30 and 32. When the split locking rings 42 have been inserted into the grooves 30 and 32 and the first and second conduit means 16 and 18 have been inserted into the coupling means 12, there exists a continuous electrical conducting circuit between the first and second conduit means 16 and 18, the split locking rings 42 and the strip 84 to provide an electrical grounding circuit.

Figure 8:
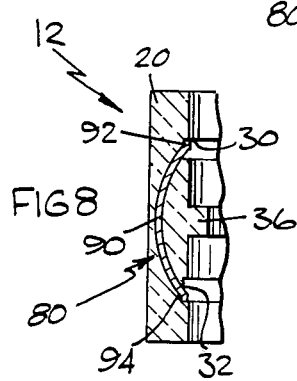
FIG. 8 is a cross-sectional view of a portion of another embodiment of the electrical conducting means.

The electrical conducting means 80 in FIG. 8 comprises an electrical conducting wire 90 embedded in the elongated hollow member 20 and having exposed end portions 92 and 94 in the grooves 30 and 32 so as to cooperate with the split locking rings 42 and the first and second conduit means 16 and 18 so as to provide the continuous electrical grounding circuit as described above.

In operation, a split locking ring 42 is positioned in each of the grooves 30 and 32 and the coupling means 12 is mounted in the opening 8 using the thermal barrier sealing material 14. One end 96 of the first conduit means 16 is inserted into a first side of the coupling means 12 and deflects the fingers 54 of the split locking ring 42 axially inwardly. The movement of the first conduit means 16 is continued until it contacts the separation means 34. One end 98 of the second conduit means 18 is inserted into a second side of the coupling means 12 and deflects the fingers 54 of the split locking ring 42 axially inwardly. The movement of the second conduit means 18 is continued until it contacts the separation means 34. As illustrated in FIG. 1, there exists a space between the one end 96 and the one end 98. Therefore, since the coupling means 12 is formed from a material having relatively low thermal conductivity properties, such as a ceramic material, only a relatively small percentage, less than 30 per cent of heat, can be transferred from the first conduit means 16 to the second conduit means 18 if the first conduit means is exposed to a fire. The amount of heat that can possibly be transferred through the coupling means 12 significantly reduces the possibility of igniting any flammable material in the another floor 6.

The coupling means 12 is dimensioned to cooperate with the size of the conduit means. In one embodiment of the invention, the conduit means has an outer diameter of about 1.315 inches, the elongated hollow member 20 has a length of about 3.0 inches, an outer diameter of about 2.5 inches, and an inner diameter of about 1.5 inches. Each groove 30 and 32 has a depth of about 0.15 inches. The separation means 34 has an inner diameter of about 1.05 inches and an axial extent of about 0.5 inches. The split locking ring has a normal diameter of about 1.3 inches.

The coupling means 12 is formed from a ceramic material having a thermal conductivity of about 0.4 B.t.u. per hr-ft-deg F and a fire resistance rating in accordance with ASTM-Test E 814 of at least 3 hours. Other materials, such as plastic composite, may be used to form the coupling means 12 provided they have the thermal conductivity and fire resistance rating as described above.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A system for passing conduit through a wall so as to maintain a firebreak for the wall comprising:
   wall means for separating one area from another area and providing a firebreak between said one area and said another area;
   opening means defining an opening extending through said wall means;
   a coupling mounted in said opening;
   said coupling formed from a material having a thermal conductivity less than 4.0 B.t.u. per hr-ft-deg F and a fire resistance rating in accordance with ASTM-Test E 814 of at least three hours;
   thermal barrier sealing means forming a seal between said opening means and said coupling;
   a first conduit having one end thereof located in a first side of said coupling;
   a second conduit having one end thereof located in a second side of said coupling;

said first and second conduit formed from a metallic materail having relatively high thermal conductivity properties;

separation means in said coupling for providing a positive space between said one ends of said first and second metallic conduits in said coupling; and retaining means for retaining said one ends of said first and second metallic conduits in said coupling means.

2. A system as in claim 1 wherein;
said coupling and said first and second metallic conduits have longitudinal axes; and
each of said longitudinal axes extends in a vertical direction.

3. A system as in claim 1 wherein:
said coupling is formed from a ceramic material.

4. A system as in claim 1 wherein said coupling comprises:
an elongated hollow member having generally cylindrical outer and inner surfaces and opposite end portions;
at least two spaced apart, annular, radially outwardly extending grooves in said cylindrical inner surface;
at least portions of said retaining means being located in each of said grooves; and
said separation means comprises an annular, radially inwardly extending projection located between said grooves.

5. A system as in claim 4 wherein said retaining means comprises:
a split locking ring having an outer diameter when in an opened condition which is substantially equal to the outer diameter of each of said grooves and an outer diameter when in a closed position which is less than the diameter of said cylindrical inner surface so that said split locking ring can be moved to a closed position and inserted into said coupling until said split locking ring is radially opposite one of said grooves and then said split locking ring is moved to an opened position so that portions thereof are located in said one of said grooves; and
resilient means for normally holding said split locking rig in said opened position and for applying a force to move said split locking ring from said closed position to said opened position.

6. A system as in claim 5 wherein said split locking ring further comprises:
a plurality of space apart, radially inwardly extending resilient fingers;
said resilient fingers being displaced axially inwardly during the insertion of said one end of said first or second metallic conduit so as to apply a restraining force against the withdrawal of said one end from said coupling.

7. A system as in claim 5 and further comprising:
electrical conducting means extending between said grooves and having an exposed contact portion located in each of said grooves for providing an electrical grounding circuit; and
said first and second conduits and said split locking ring comprising an electrical conducting material so that when a split locking ring is positioned in each of said grooves, it is in contact with said electrical conducting means and said first and second metallic conduits to provide an electrical grounding circuit between said one ends of said first and second metallic conduit.

8. A system as in claim 7 wherein said electrical conducting means comprises:
an electric wire embedded in said coupling and having an exposed end portion in each of said grooves for contact with said split locking ring in each of said grooves.

9. A system as in claim 7 wherein said electrical conducting means comprises:
an axially extending continuous groove formed in said cylindrical inner surface and said projection and having an end portion in each of said grooves; and
electrical conducting means secured in said axially extendig groove and having an exposed end portion in each of said grooves in contact with said split locking ring in each of said grooves for providing an electrical grounding circuit.

10. A system as in claim 4 wherein:
said coupling and said first and second metallic conduits have longitudinal axes;
each of said longitudinal axes extends in a vertical direction; and
each of said first and second metallic conduits means has a thermal conductivity greater than about 22.0 B.t.u. per hr-ft-deg F.

11. A system as in claim 10 and further comprising:
electrical conducting means extending between said grooves and having an exposed contact portion located in each of said grooves for providing an electrical grounding circuit; and
said first and second metallic conduits and said split locking ring comprising an electrical conducting material so that when a split locking ring is positioned in each of said grooves, it is in contact with said electrical conducting means and said first and second metallic conduits to provide an electrical grounding circuit between said one ends of said first and second metallic conduits means.

12. A system as in claim 4 and further comprising:
protection means for protecting said coupling;
said protection means comprising a relatively rigid elongated cover having a generally cylindrical portion radially opposite said cylindrical outer surface of said elongated hollow member and opposite end portions which are axially opposite to at least portions of said opposite end portions of said coupling; and
thermal insulating material surrounding said protection means and providing a thermal barrier between said protection means and said first and second metallic conduits.

13. A method for passing conduit through a wall so as to maintain a firebreak for the wall comprising:
providing a wall means for separating one area from another area and forming a firebreak between said one area and said another area;
forming an opening extending through said wall means;
mounting a coupling in said opening wherein said coupling is formed from a material having a thermal conductivity less than 4.0 B.t.u. per hr-ft deg F and a fire resistance rating in accordance with ASTM-Test E 814 of at least three hours;
applying thermal barrier sealing means between said coupling and said opening to form a fire-break therebetween;
inserting one end of a first conduit into a first side of said coupling wherein said first conduit is formed from a metallic material having relatively high thermal and electrical conductivity properties;

inserting one end of a second conduit into a second side of said coupling wherein said second conduit means is formed from a metallic material having relatively high thermal and electrical conductivity properties;

forming and maintaining a separation between said one ends of said first and second metallic conduit so as to provide a thermal barrier therebetween to limit the transfer of heat from said first or second metallic conduit means to the other.

14. A method as in claim 13 wherein:

said coupling and said first and second metallic conduits have longitudinal axes; and mounting said coupling so that the longitudinal axes of said coupling and said first and second metallic conduits extends in a vertical direction.

15. A method as in claim 14 and further comprising:

providing as said coupling, a coupling comprising as an elongated hollow member having generally cylindrical outer and inner surfaces and opposite end portions and at least two spaced apart, annular, radially outwardly extending grooves in said cylindrical inner surface; and inserting a retaining means in each of said grooves so that a portion of said retaining means contacts a portion of said first and second metallic conduit means so as to retain said first and second conduits in said coupling.

16. A method as in claim 15 and further comprising:

mounting an electrical conducting means in said coupling so that an exposed portion of said electrical conducting means is located in each of said grooves and in contact with said retaining means in each of said grooves which are in contact with the first and second metallic conduits so as to form a continuous electrical conducting circuit therebetween.

17. A method as in claim 16 and further comprising:

protecting said coupling by encasing said coupling means within a relatively rigid elongated cover means; and forming a thermal barrier between said cover means and said first and second metallic conduit.

18. Coupling means for forming a thermal insulating barrier while connecting adjacent end portions of tubular members comprising:

an elongated hollow member having generally cylindrical outer and inner surfaces and opposite end portions;

said elongated hollow member formed from a material having relatively low thermal conductivity properties and relatively high fire resistance properties;

at least two spaced apart, annular radially outwardly extending grooves in said cylindrical inner surface;

separation means comprising an annular, radially inwardly extending projection located between said grooves;

a retaining member in each of said grooves;

said retaining member being formed from an electrical conducting material; and an electrical conducting wire embedded in said coupling means and having an exposed end portion in each of said grooves in contact with said retaining means in each of said grooves.

19. Coupling means for forming a thermal insulating barrier while connecting adjacent end portions of tubular members comprising:

an elongated hollow member having generally cylindrical outer and inner surfaces and opposite end portions;

said elongated hollow member formed from a material having relatively low thermal conductivity properties and relatively high fire resistance properties;

at least two spaced apart, annular radially outwardly extending grooves in said cylindrical inner surface;

separation means comprising an annular, radially inwardly extending projection located between said grooves;

a retaining member in each of said grooves;

said retaining member being formed from an electrical conducting material;

an axially extending continuous groove formed in said cylindrical inner surface and said projection and having an end portion in each of said grooves; and electrical conducting means secured in said axially extending groove and having an exposed end portion in each of said grooves in contact with said retaining means in each of said grooves.

* * * * *